UNITED STATES PATENT OFFICE.

JOHN MILLER, OF CINCINNATI, OHIO, ASSIGNOR OF ONE-HALF TO JOSEPH G. OBERMEYRE, OF SAME PLACE.

COMPOSITION FOR COATING BRICKS.

SPECIFICATION forming part of Letters Patent No. 446,877, dated February 24, 1891.

Application filed July 25, 1890. Serial No. 359,925. (No specimens.)

*To all whom it may concern:*

Be it known that I, JOHN MILLER, a citizen of the United States, residing in Cincinnati, in the county of Hamilton and State of Ohio, have invented a new and useful composition of matter to prevent and remove the efflorescence upon pressed brick, as well as upon stock brick and common brick buildings.

This composition of matter consists of the following ingredients: To one quantity of beeswax add double the quantity of paraffine, with one-half ($\frac{1}{2}$) pint of shellac dissolved in alcohol added to a gallon of the first quantity reduced to a liquid state by heating.

The method of using this composition of matter is as follows: Wash the surface to be treated with muriatic acid to remove what efflorescence there may be on it. Then heat the surface with a charcoal-furnace to a temperature of 200° or 300°. Then apply the composition of matter while the surface is still in a heated condition with a fine-haired brush.

What I claim is—

The herein-described paint compound composed of beeswax, paraffine, and an alcoholic solution of shellac, in the proportions specified.

JOHN MILLER.

Attest:
SCOTT BONHAM,
W. J. RUSK.